Patented Oct. 29, 1929

1,733,468

UNITED STATES PATENT OFFICE

MAX RAECK, OF DESSAU-ZIEBIGK, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS OF PRODUCING DERIVATIVES OF 2-HYDROXYNAPHTHALENE-3-CARBOXYLIC ACID AMIDE

No Drawing. Application filed March 20, 1928, Serial No. 263,224, and in Germany April 22, 1927.

By the present invention derivatives of 2-hydroxynaphthalene-3-carboxylic acid amide, which are of high importance in the dyeing art, are made by heating 2-hydroxynaphthalene-3-carboxylic acid with a mustard oil. The reaction occurs in a surprisingly smooth manner and with very good yield.

For example, 18.8 parts by weight of 2-hydroxynaphthalene-3-carboxylic acid are heated with 13.5 parts by weight of phenyl mustard oil at about 220° C. until evolution of carbon oxysulfide is at an end. On cooling, the 2-hydroxynaphthalene-3-carboxylic acid phenylamide crystallizes in a very pure form.
The yield is quantitative. The reaction may be explained by the equation:

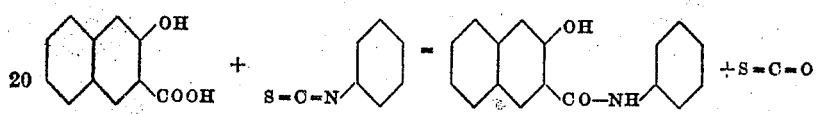

Instead of phenyl mustard oil any ester of isothiocyanic acid can be used with like result, for instance an alkyl mustard oil or an aryl mustard oil, substituted or not in the nucleus, such as a tolyl mustard oil, a chlorophenyl mustard oil, or a naphthyl mustard oil.

What I claim is:
1. Process of producing 2-hydroxynaphthalene-3-carboxylic acid amides by treating 2-hydroxynaphthalene-3-carboxylic acid with a mustard oil.
2. Process of producing 2-hydroxynaphthalene-3-carboxylic acid amides by treating 2-hydroxynaphthalene-3-carboxylic acid with an aryl mustard oil.
3. Process of producing 2-hydroxynaphthalene-3-carboxylic acid phenylamide by heating 2-hydroxynaphthalene-3-carboxylic acid with phenyl mustard oil.

In testimony whereof I affix my signature.

MAX RAECK.